United States Patent [19]

Tan

[11] Patent Number: 5,610,265
[45] Date of Patent: Mar. 11, 1997

[54] ARMOMATIC POLYIMIDES DERIVED FROM 2-(N-BENZOYLIMINO)-4,4-DIAMINOBIPHENYL

[75] Inventor: Loon-Seng Tan, Centerville, Ohio

[73] Assignee: The United States of America as represented by The Secretary of the Air Force, Washington, D.C.

[21] Appl. No.: 605,231

[22] Filed: Feb. 2, 1996

[51] Int. Cl.$^6$ .................... C08G 69/26; C08G 73/10
[52] U.S. Cl. ............. 528/353; 528/125; 528/128; 528/170; 528/172; 528/173; 528/174; 528/179; 528/185; 528/188; 528/220; 528/229; 528/350
[58] Field of Search ............ 528/125, 128, 528/170, 172, 173, 174, 179, 185, 188, 220, 229, 350, 353

[56] References Cited

U.S. PATENT DOCUMENTS 3,839,330  10/1974  Thominet .................. 544/132
5,061,783  10/1991  St. Clair ................... 528/353

OTHER PUBLICATIONS

L–S Tan and S. R. Simko, "Aromatic Polyimides Based on an Asymmetrically Benzamide–Pendanted Benzidine", Polymer Preprints, vol. 36, No. 1, Apr. 1995, published Mar. 1, 1995.

Primary Examiner—James J. Seidleck
Assistant Examiner—P. Hampton-Hightower
Attorney, Agent, or Firm—Charles E. Bricker; Thomas L. Kundert

[57] ABSTRACT

A rigid-rod aromatic polyimide having repeating units of the formula:

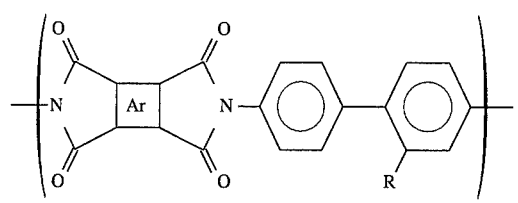

wherein Ar is:

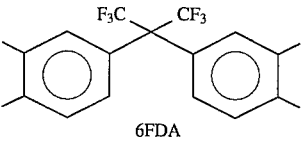

6FDA,

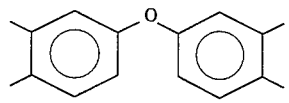

ODA,

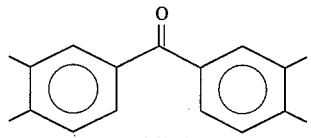

BTDA,

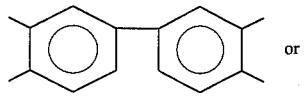

BPDA or

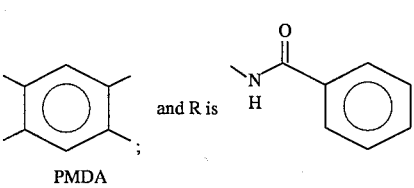

PMDA;

and R is

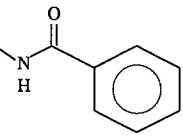

6 Claims, No Drawings

ARMOMATIC POLYIMIDES DERIVED FROM 2-(N-BENZOYLIMINO)-4,4-DIAMINOBIPHENYL

RIGHTS OF THE GOVERNMENT

The invention described herein may be manufactured and used by or for the Government of the United States for all governmental purposes without the payment of any royalty.

BACKGROUND OF THE INVENTION

The present invention relates to new aromatic polyimide compositions containing an asymmetrically situated benzamide group that improves polymer solubility.

Rigid-rod polymers are a unique class of thermally stable, aromatic polymers which share the common feature of having a polymer backbone with an all-para geometry and catenation angles of approximately 180 degrees. The only freedom of molecular movement available to this type of structure is the axial rotation, namely, rotations around the carbon-carbon single bonds within the repeat units. Amongst the heterocyclic rigid-rod polymers, the most extensively studied, hitherto, are polybenzoxazole (PBX) family, as represented by polybenzobisthiazoles (PBZT's), polybenzoxazoles (PBO's) and polybenzobisimidazoles (PBI's). The simplest polymers in these families have repeating groups, as follows:

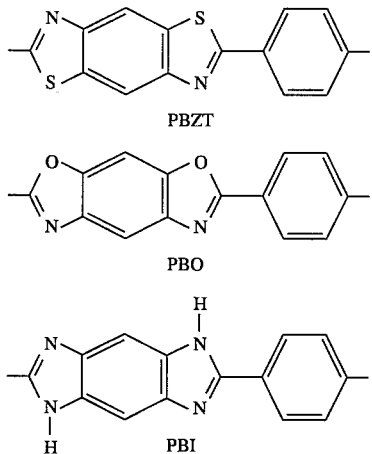

The PBX polymers form lyotropic solutions in polyphosphoric acid, methanesulfonic acid, and Lewis acid/nitroalkane. The exploitation of their lyotropic properties has provided nonmetallic materials in the forms of fibers and films with ultra-high specific strength and moduli.

By their molecular geometry, the combinations of aromatic paradiamines and linear aromatic dianhydrides, such as pyromellitic dianhydride (PMDA), naphthlene carboxylic dianhydride (NCDA) and other related higher homologues, constitute another family of rigid-rod polymers, rigid-rod aromatic polyimides (RRPI's), having aromatic heterocyclic structures. These polymers have repeating units as shown, for example, below:

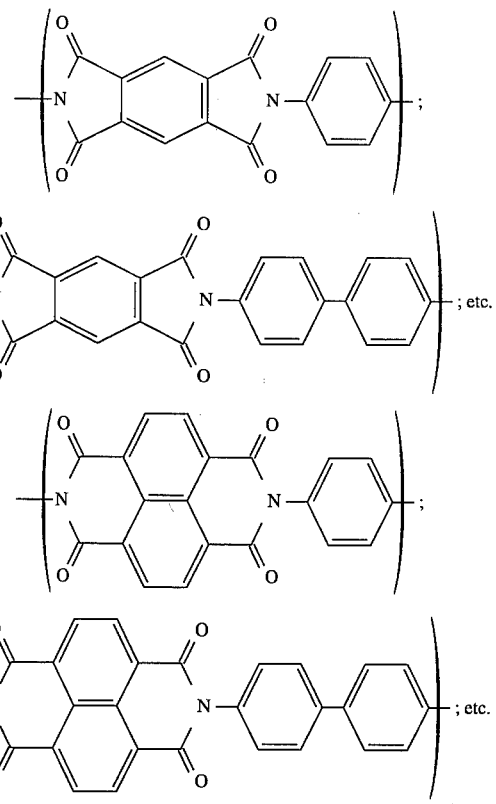

Whereas, as noted previously, PBX polymers form lyotropic solutions in polyphosphoric acid, methanesulfonic acid, and Lewis acid/nitroalkane, RRPI's derived from simple para aromatic diamines show little or no solubility in these acidic solvents. For example, the RRPI derived from PMDA and p-phenylenediamine is only soluble in fuming nitric acid and then only with a substantial degree of polymer degradation.

Because polymer solubility is important in providing more options in the processing and fabrication of RRPI for uses as advanced structural materials and reinforcement component in composites, a common approach to improving their solubilities in organic solvents has been the structural modification of RRPI via pendant chemistry. Thus, extensive backbone substitution with appropriate pendant groups such as, long alkyl chains, phenyl rings, and $SO_3H$, has resulted in PMDA-based RRP's being soluble in solvents ranging from chloroform and toluene to N-methyl-2-pyrrolidinone (NMP) and m-cresol to water and sulfuric acid.

I have prepared a series of RRPI's having increased solubility in a variety of solvents.

Accordingly, it is an object of the present invention to provide novel rigid-rod aromatic polyimides.

Other objects and advantages of the present invention will be apparent to those skilled in the art.

SUMMARY OF THE INVENTION

In accordance with the present invention, there are provided novel rigid-rod aromatic polyimides having repeating units of the formula:

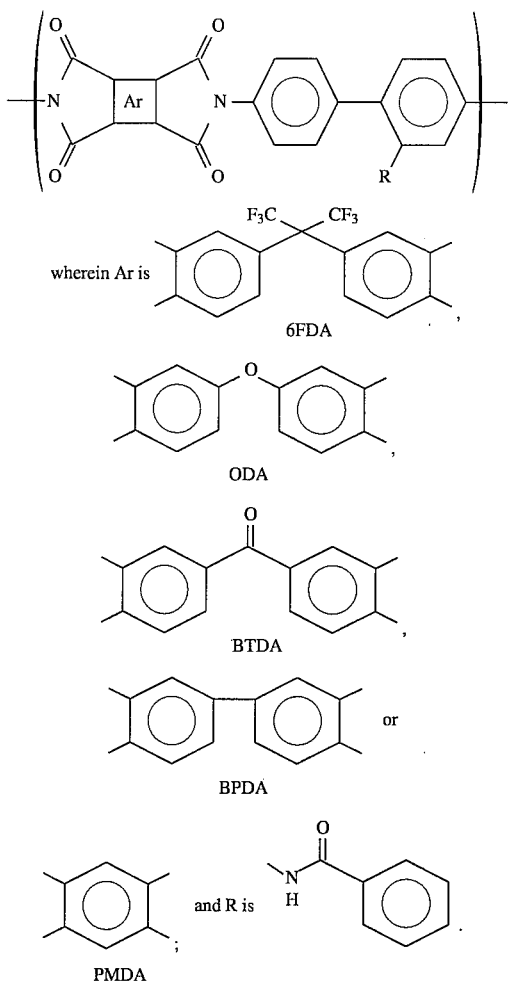

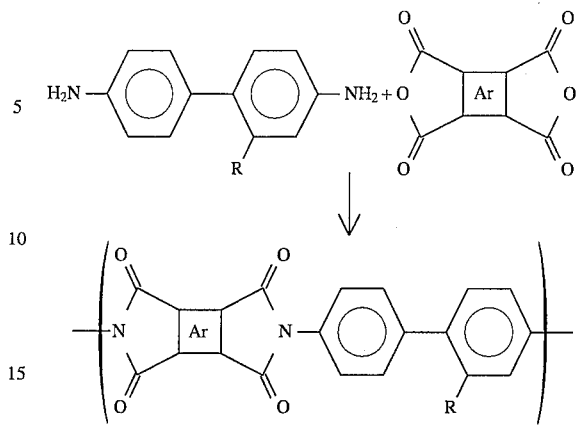

wherein Ar and R are as defined previously.

The polycondensation is a two-step procedure. In the first step, 4,4'-diaminobiphenyl-2-benzamide is reacted with a dianhydride in a suitable solvent, such as N-methyl pyrrolidinone, under an inert atmosphere, such as nitrogen, at ambient temperature for about 12 to 48 hours to yield a poly(amic acid) solution. In the second step, the poly(amic acid) solution is imidized by the addition of an anhydride, such as acetic anhydride, and an amine, such as triethylamine or pyridine. The polymer is then recovered, washed and dried.

The preparation of 4,4'-diaminobiphenyl-2-benzamide is described in application Ser. No. 08/605,234, filed of even date herewith.

The following examples illustrate the invention:

DETAILED DESCRIPTION OF THE INVENTION

The rigid-rod aromatic polyimides of the present invention are prepared by the polycondensation of 4,4'-diaminobiphenyl-2-benzamide with a suitable dianhydride as shown by the following reaction:

EXAMPLE 1

Synthesis of Poly((1,3-dihydro-1,3-dioxo-2H-isoindole-2,5-diyl)(2,2,2-trifluoro-1-(trifluoromethyl)ethylidene)(1,3-dihydro-1,3-dioxo-2H-isoindole-5,2-diyl)(2-benzamido(1,1'-biphenyl)-4,4'-diyl))

(polymer I)

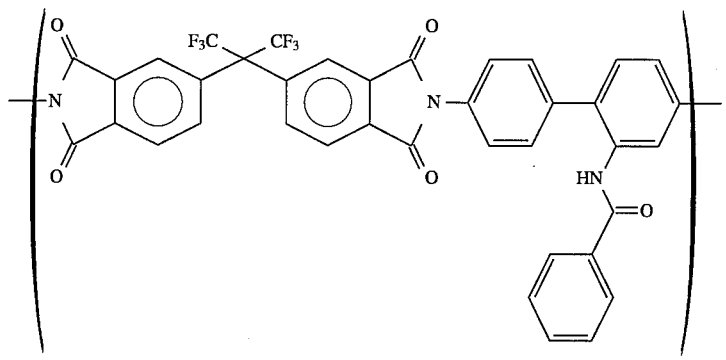

4,4'-Diaminobiphenyl-2-benzamide (1.000 g, 3.2964 mmol), hexafluoroisopropyl-3,3'-diphthalic anhydride (6FDA) (1.4644 g, 3.2964 mmol) and N-methyl pyrrolidinone (15% wt/vol) were stirred under nitrogen flow at ambient temperature for 18–23 hours to yield a poly(amic acid) solution which was then imidized by the addition of acetic anhydride (2.04 g, 20 mmol) and triethylamine (2.02 g, 20 mmol) from a dropping funnel in three portions over 10 minutes. Stirring was continued for 22–24 h. The contents of the reaction flask were transferred to 500 ml of cold water with stirring, chopped in a blender if necessary and filtered. The polymer was washed with water until the filtrate was clear and colorless, and further washed with water in a Soxhlet extraction apparatus for 2 days, then dried under reduced pressure at 189° C. for 2 days.

Elem. analysis calc'd for $C_{38}H_{19}F_6N_3O_5$: C, 64.14; H, 2.69; N, 5.90. Found: C, 63.34; H, 2.61; N, 5.55. FTIR (KBr): 3430(m)(NH str); 1786(w) & 1729(s) (imide-carbonyl str.); 1683 (w) (NH bend); 1530–1434 (4 bands) (mono-substituted benzene); 1256 & 1195 & 1146 (CF str.)

EXAMPLE 2

Synthesis of Poly((1,3-dihydro-1,3-dioxo-2H-isoindole-2,5-diyl)oxy(1,3-dihydro-1,3-dioxo-2H-isoindole-5,2-diyl)(2-benzamido(1,1'-biphenyl)-4,4'-diyl)) (polymer II)

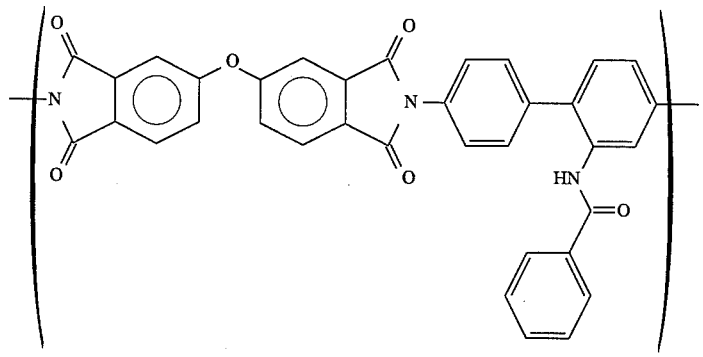

4,4'-Diaminobiphenyl-2-benzamide (1.000 g, 3.2964 mmol), oxy-3,3'-phthalic dianhydride (ODA) (1.0226 g, 3.2964 mmol) and N-methyl pyrrolidinone (15% wt/vol) were stirred under nitrogen flow at ambient temperature for 18–23 h to yield a poly(amic acid) solution which was then imidized by the addition of acetic anhydride (2.04 g, 20 mmol) and triethylamine (2.02 g, 20 mmol) :from a dropping funnel in three portions over 10 minutes. Stirring was continued for 22–24 h. The contents of the reaction flask were transferred to 500 ml of cold water with stirring, chopped in a blender if necessary and filtered. The polymer was washed with water until the filtrate was clear and colorless, and further washed with water in a Soxhlet extraction apparatus for 2 days, then dried under reduced pressure at 189° C. for 2 days.

Elem analysis calc'd for $C_{35}H_{19}N_3O_6$: C, 72.79; H, 3.31; N, 7.27. Found: C, 71.30; H, 3.76; N, 7.70. FTIR (KBr): 3426(m)(NH str); 1780(w) & 1724 (s) (imide-carbonyl str.); 1678(w)(NH bend); 1518–1436 (4 bands)(mono-substituted benzene; 1275 & 1238 (Ar-O-Ar)

EXAMPLE 3

Synthesis of Poly((1,3-dihydro-1,3-dioxo-2H-isoindole-2,5-diyl)carbonyl(1,3-dihydro-1,3-dioxo-2H-isoindole-5,2-diyl)(2-benzamido(1,1'-biphenyl)-4,4'-diyl)) (polymer III)

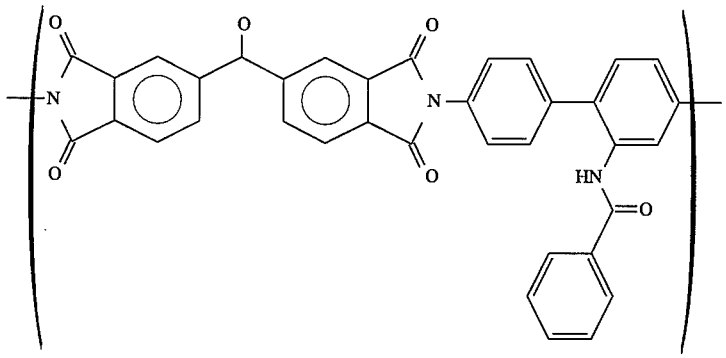

4,4'-diaminobiphenyl-2-benzamide (1.000 g, 3.2964 mmol), 3,3',4,4'-benzophenone tetracarboxylic dianhydride (BTDA) (1.6022 g, 3.2964 mmol) and N-methyl pyrrolidinone (15% wt/vol) were stirred under nitrogen flow at ambient temperature for 18–23 h to yield a poly(amic acid) solution which was then imidized by the addition of acetic anhydride (2.04 g, 20 mmol) and triethylamine (2.02 g, 20 mmol) from a dropping funnel in three portions over 10 minutes. Stirring was continued for 22–24 h. The contents of the reaction flask were transferred to 500 ml of cold water with stirring, chopped in a blender if necessary and filtered. The polymer was washed with water until the filtrate was clear and colorless, and further washed with water in a Soxhlet extraction apparatus for 2 days, then dried under reduced pressure at 189° C. for 2 days.

Elem analysis calc'd for $C_{36}H_{19}N_3O_6$: C, 73.34; H, 3.25; N, 7.13. Found: C, 71.63; H, 3.31; N, 6.82 FTIR (KBr): 3424 (NH str); 1780(w) & 1723(s) (imide-carbonyl str.); 1669(m) & 1622(w); 1530–1432 (4 bands)(mono-substituted benzene)

EXAMPLE 4

Synthesis of Poly((5,7-dihydro- 1,3,5,7-tetraoxobenzo(1,2-c:4,5-c')dipyrrole-2,6-(1H,3H)-diyl)(2-benzamido(1,1'-biphenyl)-4,4'-diyl)) (polymer IV)

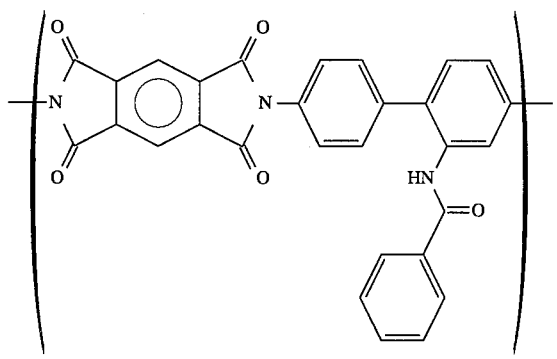

4,4'-diaminobiphenyl-2-benzamide (1.000 g, 3.2964 mmol), pyromellitic dianhydride (PMDA) (0.7190 g, 3.2964 mmol) and N-methyl pyrrolidinone (15% wt/vol) were stirred under nitrogen flow at ambient temperature for 18–23 h to yield a poly(amic acid) solution which was then imidized by the addition of acetic anhydride (2.04 g, 20 mmol) and triethylamine (2.02 g, 20 mmol) from a dropping funnel in three portions over 10 minutes. Stirring was continued for 22–24 h. The contents of the reaction flask were transferred to 500 ml of cold water with stirring, chopped in a blender if necessary and filtered. The polymer was washed with water until the filtrate was clear and colorless, and further washed with water in a Soxhlet extraction apparatus for 2 days, then dried under reduced pressure at 189° C. for 2 days.

Elem analysis calc'd for $C_{29}H_{15}N_3O_5$: C, 71.75; H, 3.11; N, 8.65. Found: C, 69.91; H, 3.15; N, 8.49 FTIR (KBr): 3424 (NHstr); 1781(w) & 1726 (s) (imide-carbonyl str.); 1677 (NH bend); 15 15–1436 (4 bands)(mono-substituted benzene)

EXAMPLE 5

Synthesis of Poly((1,1',3,3'-tetrahydro-1,1',3,3'-tetraoxo(5,5'-bi-2H-isoindole)-2,2'-diyl)(2-benzamido(1,1'-biphenyl)-4,4'-diyl)) (polymer V)

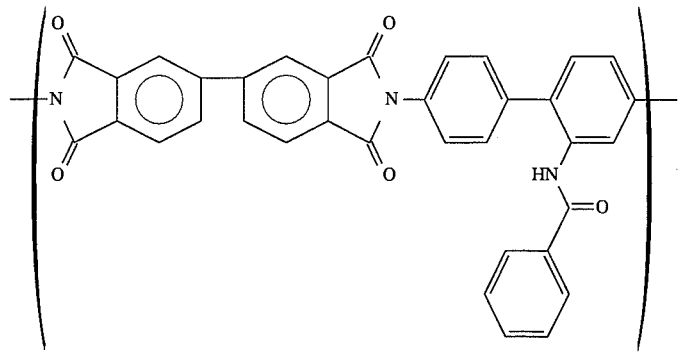

4,4'-diaminobiphenyl-2-benzamide (1.000 g, 3.2964 mmol), syn-biphenyl tetracarboxylic dianhydride (BPDA) (0.9699 g, 3.2964 mmol) and N-methyl pyrrolidinone (15% wt/vol) were stirred under nitrogen flow at ambient temperature for 18–23 h to yield a poly(amic acid) solution which was then imidized by the addition of acetic anhydride (2.04 g, 20 mmol) and triethylamine (2.02 g, 20 mmol) from a dropping funnel in three portions over 10 minutes. Stirring was continued for 22–24 h. The contents of the reaction flask were transferred to 500 ml of cold water with stirring, chopped in a blender if necessary and filtered. The polymer was washed with water until the filtrate was clear and colorless, and further washed with water in a Soxhlet extraction apparatus for 2 days, then dried under reduced pressure at 189° C. for 2 days.

Elem analysis calc'd for $C_{35}H_{19}N_3O_5$: C, 74.86; H, 3.41; N, 7.48. Found: C, 72.37; H, 3.25; N, 7.19 FTIR (KBr): 3429(NHstr); 1778(w) & 1722(s) (imide-carbonyl str.); 1680 (NH bend); 15 15–1432 (4 bands)(mono-substituted benzene)

COMPARATIVE EXAMPLE 1

Synthesis of Poly((1,3-dihydro-1,3-dioxo-2H-isoindole-2,5-diyl)(2,2,2-trifluoro-1-(trifluoromethyl)ethylidene)(1,3-dihydro-1,3-dioxo-2H-isoindole-5,2-diyl) (1,1'-biphenyl-4,4'-diyl)) (polymer C-I)

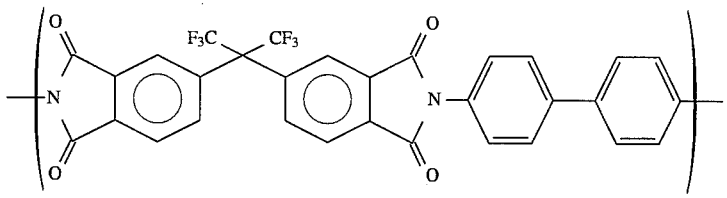

Benzidine (1.000 g, 5.4280 mmol), hexafluoroisopropyl-3,3'-diphthalic anhydride (2.4113 g, 5.4280 mmol) and N-methyl pyrrolidinone (15% wt/vol) were stirred under a nitrogen flow at ambient temperature for 18–20 h to yield a poly(amic acid) solution which was then imidized by the addition of a combined solution of acetic anhydride/triethylamine/N,N-dimethylacetamide to give a total-solid content of 10%. Acetic anhydride and triethylamine each made up 10% of the total volume of all liquids and enough DMAc was added to make a total-solid content of 10%. The combined solution was added dropwise from a dropping funnel until the contents of the flask began to climb the stir rod, then the remainder was added in one portion with slow stirring. Slow stirring was continued under nitrogen flow for 22–24 h. The contents of the reaction flask were transferred to 500 ml cold water with stirring, chopped in a blender and filtered. The polymer was washed with water until the filtrate was clear and colorless, and further washed with water in a Soxhlet extraction apparatus for 2 days, then dried under reduced pressure at 189° C. for 2 days.

Elem. analysis calc'd for $C_{31}H_{14}F_6N_2O_4$: C, 62.85; H, 2.38; N, 4.73. Found: C, 61.60; H, 2.4; N, 4.59. FTIR (KBr): 3438(m)(NHstr); 1787(w) & 1726(s) (imide-carbonyl str.); 1256 & 1195 & 1147 (CF str.)

COMPARATIVE EXAMPLE 2

Synthesis of Poly((1,3-dihydro-1,3-dioxo-2H-isoindole-2,5-diyl)oxy(1,3-dihydro-1,3-dioxo-2H-isoindole-5,2-diyl)(1,1'-biphenyl-4,4'-diyl)) (polymer C-II)

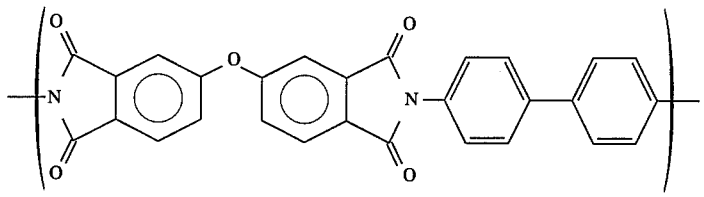

Benzidine (1.000, 5.4280 mmol), oxy-3,3'-diphthalic anhydride(1.6838, 5.4280 mmol)and N-methyl pyrrolidinone (15% wt/vol) were stirred under a nitrogen flow at ambient temperature for 18–20 h to yield a poly(amic acid) solution which was then imidized by the addition of a combined solution of acetic anhydride/triethylamine/N,N-dimethylacetamide to give a total-solid content of 10%. Acetic anhydride and triethylamine each made up 10% of the total volume of all liquids and enough DMAc was added to make a total-solid content of 10%. The combined solution was added dropwise from a dropping funnel until the contents of the flask began to climb the stir rod, then the remainder was added in one portion with slow stirring. Slow stirring was continued under nitrogen flow for 22–24 h. The contents of the reaction flask were transferred to 500 ml cold water with stirring, chopped in a blender and filtered. The polymer was washed with water until the filtrate was clear and colorless, and further washed with water in a Soxhlet extraction apparatus for 2 days, then dried under reduced pressure at 189° C. for 2 days.

Elem analysis calc'd for $C_{28}H_{14}N_2O_5$: C, 73.36; H, 3.08; N, 6.11. Found: C, 73.08; H, 3.82; N, 6.95. FTIR (KBr): 3387(m)(NHstr); 1779(w) & 1723 (s) (imide-carbonyl str.); 1271 & 1238 (Ar-O-Ar)

COMPARATIVE EXAMPLE 3

Synthesis of Poly((1,3-dihydro-1,3-dioxo-2H-isoindole-2,5-diyl)carbonyl(1,3-dihydro-1,3-dioxo-2H-isoindole-5,2-diyl)(1,1'-biphenyl-4,4'-diyl)) (polymer C-III)

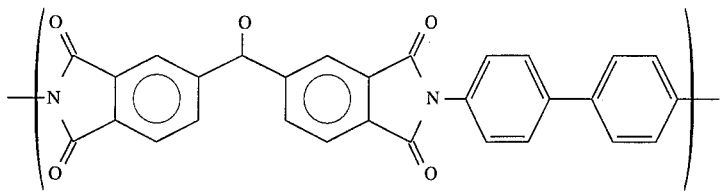

Benzidine (1.000, 5.4280 mmol), 3,3',4,4'-benzophenone tetracarboxylic dianhydride (1.7491, 5.4280 mmol) and N-methyl pyrrolidinone (15% wt/vol) were stirred under a nitrogen flow at ambient temperature for 18–20 h to yield a poly(amic acid) solution which was then imidized by the addition of a combined solution of acetic anhydride/triethylamine/N,N-dimethylacetamide to give a total-solid content of 10%. Acetic anhydride and triethylamine each made up 10% of the total volume of all liquids and enough DMAc was added to make a total-solid content of 10%. The combined solution was added dropwise from a dropping funnel until the contents of the flask began to climb the stir rod, then the remainder was added in one portion with slow stirring. Slow stirring was continued under nitrogen flow for 22–24 h. The contents of the reaction flask were transferred to 500 ml cold water with stirring, chopped in a blender and filtered. The polymer was washed with water until the filtrate was clear and colorless, and further washed with water in a Soxhlet extraction apparatus for 2 days, then dried under reduced pressure at 189° C. for 2 days.

Elem analysis calc'd for $C_{29}H_{14}N_2O_5$: C, 74.04; H, 3.00; N, 5.95. Found: C, 71.70; H, 3.18; N, 5.82 FTIR (KBr): 3437(NHstr); 1780(w) & 1723(s) (imide-carbonyl str.); 1669(w) & 1622 (w)

COMPARATIVE EXAMPLE 4

Synthesis of Poly((5,7-dihydro-1,3,5,7-tetraoxobenzo(1,2-c:4,5-c')dipyrrole-2,6-(1H,3H)-diyl)(1,1'-biphenyl-4,4'-diyl)) (polymer C-IV)

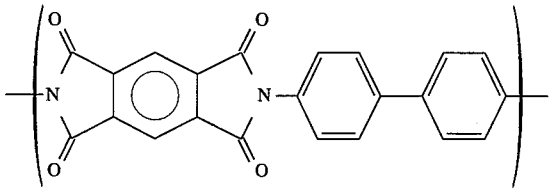

Benzidine (1.000, 5.4280 mmol), pyromellitic dianhydride(1.1840, 5.4280 mmol) and N-methyl pyrrolidinone (15% wt/vol) were stirred under a nitrogen flow at ambient temperature for 18–20 h to yield a poly(amic acid) solution which was then imidized by the addition of a combined solution of acetic anhydride/triethylamine/N,N-dimethylacetamide to give a total-solid content of 10%. Acetic anhydride and triethylamine each made up 10% of the total volume of all liquids and enough DMAc was added to make a total-solid content of 10%. The combined solution was added dropwise from a dropping funnel until the contents of the flask began to climb the stir rod, then the remainder was added in one portion with slow stirring. Slow stirring was continued under nitrogen flow for 22–24 h. The contents of the reaction flask were transferred to 500 ml cold water with stirring, chopped in a blender and filtered. The polymer was washed with water until the filtrate was clear and colorless, and further washed with water in a Soxhlet extraction apparatus for 2 days, then dried under reduced pressure at 189° C. for 2 days.

Elem analysis calc'd for $C_{22}H_{10}N_2O_4$: C, 72.13; H, 2.75; N, 7.65. Found: C, 70.06; H, 2.82; N, 7.45 FTIR (KBr): 3436(NHstr); 1780(w) & 1725 (s) (imide-carbonyl str.)

COMPARATIVE EXAMPLE 5

Synthesis of Poly((1,1',3,3'-tetrahydro-1,1',3,3'-tetraoxo(5,5'-bi-2H-isoindole)-2,2'-diyl)(1,1'-biphenyl)-4,4'-diyl)) (polymer C-V)

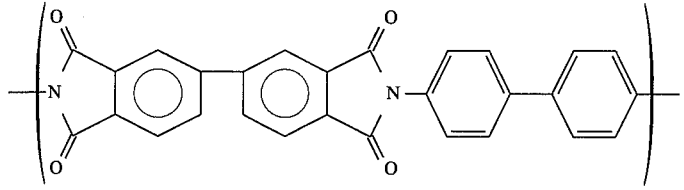

Benzidine (1.000 g, 5.4280 mmol), syn-biphenyl tetracarboxylic dianhydride(1.5970 g, 5.4280 mmol) and N-methyl pyrrolidinone (15% wt/vol) were stirred under a nitrogen flow at ambient temperature for 18–20 h to yield a poly(amic acid) solution which was then imidized by the addition of a combined solution of acetic anhydride/triethylamine/N,N-dimethylacetamide to give a total-solid content of 10%. Acetic anhydride and triethylamine each made up 10% of the total volume of all liquids and enough DMAc was added to make a total-solid content of 10%. The combined solution was added dropwise from a dropping funnel until the contents of the flask began to climb the stir rod, then the remainder was added in one portion with slow stirring. Slow stirring was continued under nitrogen flow for 22–24 h. The contents of the reaction flask were transferred to 500 ml cold water with stirring, chopped in a blender and filtered. The polymer was washed with water until the filtrate was clear and colorless, and further washed with water in a Soxhlet extraction apparatus for 2 days, then dried under reduced pressure at 189° C. for 2 days.

Elem analysis calc'd for $C_{28}H_{14}N_2O_4$: C, 76.01; H, 3.19; N, 6.33. Found: C, 73.65; H, 3.05; N, 6.10 FTIR (KBr): 3472(NHstr); 1777(w) & 1719(s) (imide-carbonyl str.)

POLYMER PROPERTIES

All polymers show the characteristic symmetric and asymmetric carbonyl stretches of the imide group at 1787–1777 cm$^{-1}$ (weak) and 1729–1719 cm$^{-1}$ (strong), respectively. The amide-pendanted polyimides (Examples 1–5) showed additional NH stretches (3424–3429 cm$^{-1}$) and amido-carbonyl bands (1665–1683 cm$^{-1}$).

In general, the substituted polyimides (Examples 1–5) demonstrated greater solubility than the unsubstituted polyimides (Comparative Examples 1–5). Almost all of the polymers were soluble in concentrated sulfuric acid whereas only substituted polyimides were soluble in methanesulfonic acid (MSA). Of particular interest is that the rigid-rod polyimide V (Example 5) is soluble in MSA up to about 5% by weight at room temperature, whereas its unsubstituted counterpart C-V (Comparative Example 5) only swells in MSA. An examination of the 5% solution of V with an optical microscope under cross-polars did not detect any solution anisotropy (birefringence), possibly due to insufficient molecular weight. Although both IV and V were more soluble in $H_2SO_4$ than in MSA, V was more soluble in MSA than IV which gelled grossly at 3% concentration in MSA. Solubility in non-aprotic solvents was observed only for the hexafluoro- and the ether-containing moieties. A dark amber, semi-tough film was cast from 5% solution of 6F-benzamide-pendant polyimide I in chloroform.

The following table I presents Viscosity and Solubility Data for Benzamide-Pendanted Polyimides (I to V) and Unmodified Polyimides (C-I to C-V). All intrinsic viscosity values ($\eta$), in dL/g, were determined in conc. $H_2SO_4$ at 30° C. All solutions for the solubility test were 0.5% (wt/vol.) and were stirred at room temperature for 24 h. The solvents used were: sulfuric acid (SA); methanesulfonic acid (MSA); m-cresol (MC); chloroform (CHF); tetrahydrofuran (THF); N,N'-dimethylacetamide (DMAc); N-methylpyrrolidione (NMP); and N,N'-dimethylforamide (DMF). The abbreviations indicating solubility are: S, soluble; ss, slightly soluble or swelling; INS, insoluble.:

TABLE I

| Polymer No. | ($\eta$) | SA | MSA | MC | CHF | THF | DMA | NMP | DMF |
|---|---|---|---|---|---|---|---|---|---|
| I | 0.12 | S | ss | S | S | S | S | S | S |
| C-I | 0.23 | S | ss | S | ss | ss | ss | ss | ss |
| II | 0.12 | S | S | S | INS | ss | S | S | S |
| C-II | — | S | ss | ss | ss | INS | ss | ss | ss |
| III | 0.27 | S | S | ss | ss | INS | INS | ss | INS |
| C-III | — | S | ss | INS | ss | INS | INS | INS | INS |
| V | 0.54 | S | S | ss | INS | INS | ss | ss | ss |
| C-V | — | ss | INS | ss | ss | INS | ss | ss | ss |
| IV | 0.54 | S | S | ss | ss | INS | ss | ss | ss |
| C-IV | — | ss | ss | ss | ss | ss | ss | INS | INS |

Thermogravimetric analysis (TGA; 10° C./min) studies of the pendanted polyimides I to V and the unmodified C-I to C-V indicated that in most cases, the presence of a benzamide pendant group resulted in a small to moderate decrease in thermo-oxidative stability ranging from 25° C. to 50° C. in air and 15° C. to 80° C. in helium. The substituted polyimides I to V exhibited 10% weight loss at temperatures from 455° C. to 505° C. in air and from 450° C. to 520° C. which compared favorably with the results for the unsubstituted polyimides C-I to C-V, 490° C.–530° C. in air, and 425° C.–520° C. in helium. All unsubstituted polymers underwent one-step degradation except for the ether-linkage (ODA) polyimide C-II which showed two-step degradation.

Differential scanning calorimetry (DSC, 10° C./min) data indicated that only two of the ten polyimides had a glass transition temperature. The substituted ether-linkage polyimide II gave a glass transition temperature ($T_g$) of 220° C. and the substituted hexafluoro polyimide I gave a $T_g$ of approximately 310° C.

Thermogravimetric analysis-mass spectroscopic study of V showed that the benzamide pendant started to degrade about 300° C. However, it did not come off intact but appeared to cleave as a phenyl radical and CO. The polyimide backbone broke up about 400° C. with the evolution of CO, $CO_2$, $(C_6H_5)_2$ and PhCN.

The following table II gives the thermal properties of aromatic polyamides with and without iminobenzoyl pendants. $T_g$ was determined by DSC conducted at 10° C./min under nitrogen atmosphere. TGA runs were conducted at 10° C./min. $T_{onset}$ is the onset temperature of degradation and $T_{10\%}$ is the temperature at which 10% loss of the original weight was observed.

TABLE II

| Polymer No. | $T_g$ | Air | | He | |
|---|---|---|---|---|---|
| | | $T_{onset}$ | $T_{10\%}$ | $T_{onset}$ | $T_{10\%}$ |
| I | 310 | 436 | 505 | 501 | 520 |
| C-I | — | 531 | 530 | 524 | 535 |
| II | 220 | 387 | 455 | 383 | 450 |
| C-II | — | 323 | 510 | 291 | 425 |
| III | — | 431 | 470 | 445 | 490 |
| C-III | — | 531 | 520 | 549 | 555 |
| V | — | 412 | 500 | 453 | 490 |
| C-V | — | 516 | 490 | 571 | 570 |
| IV | — | 443 | 500 | 477 | 495 |
| C-IV | — | 511 | 495 | 565 | 550 |

Various modifications may be made in the instant invention without departing from the spirit and scope of the appended claims.

I claim:

1. A rigid-rod aromatic polyimide having repeating units of the formula:

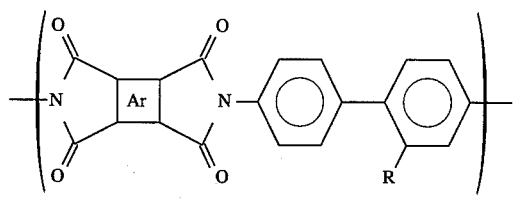

wherein Ar is selected from the group consisting of:
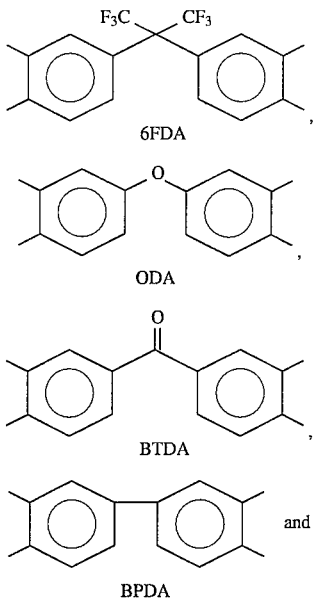
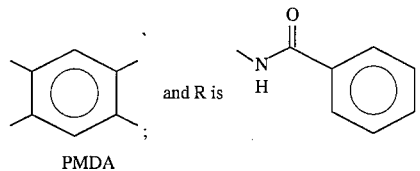
2. The polymer of claim 1 wherein Ar is 6FDA.
3. The polymer of claim 1 wherein Ar is ODA.
4. The polymer of claim 1 wherein Ar is BTDA.
5. The polymer of claim 1 wherein Ar is BPDA.
6. The polymer of claim 1 wherein Ar is PMDA.
* * * * *